E. A. BARDWELL.
NUT LOCK.
APPLICATION FILED OCT. 18, 1913.
1,105,123.
Patented July 28, 1914.
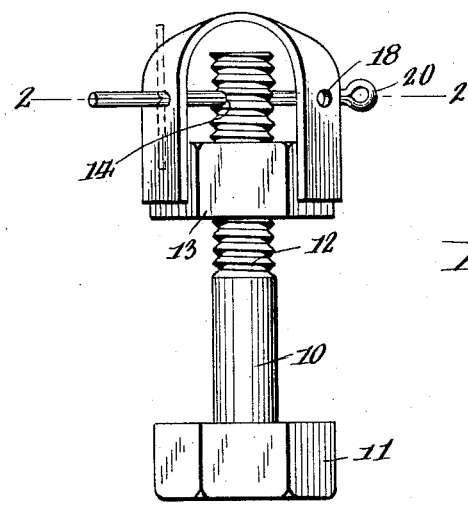
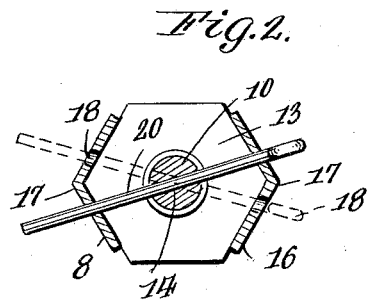
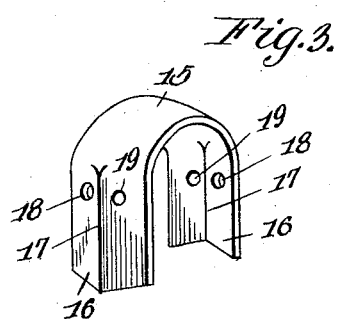
Witnesses
G. M. Spring.
Ross J. Woodward.
Inventor
Edwin A. Bardwell,
By Richard Bowen,
his Attorney

UNITED STATES PATENT OFFICE.

EDWIN A. BARDWELL, OF SHELBURNE FALLS, MASSACHUSETTS.

NUT-LOCK.

1,105,123.   Specification of Letters Patent.   Patented July 28, 1914.

Application filed October 18, 1913. Serial No. 796,093.

*To all whom it may concern:*

Be it known that I, EDWIN A. BARDWELL, citizen of the United States, residing at Shelburne Falls, in the county of Franklin and State of Massachusetts, have invented certain new and useful Improvements in Nut-Locks, of which the following is a specification.

This invention relates to an improved nut lock, and the principal object of the invention is to provide an improved means for locking a nut upon a bolt thus preventing the nut from moving from an adjusted position upon the bolt.

Another object of the invention is to so construct the nut-engaging means that the nut may be locked with a small amount of adjustment.

Another object of the invention is to so construct the nut lock that the body portion may be formed from a single strip of material and thus very cheaply manufactured.

This invention is illustrated in the accompanying drawings wherein—

Figure 1 is a side elevation showing the improved nut lock in use; Fig. 2 is a transverse sectional view taken along the line 2—2 of Fig. 1; and Fig. 3 is a perspective view of the nut-engaging means.

In the accompanying drawings the numeral 10 indicates a bolt which is provided with a head 11 at one end and has its opposite end portion threaded as shown at 12. The nut 13 is mounted upon the threaded end portion of the bolt and is intended to be screwed upon the bolt beyond the transversely extending opening 14 which is formed in the threaded end portion of the bolt. A strip of sheet metal is bent intermediate its length to form the U-shaped locking means 15 which has its two arms 16 bent longitudinally upon the center lines 17 so that the arms of the locking means will engage two faces of a six-sided nut, as shown in Fig. 2. These arms 16 are each provided with the openings 18 and 19 so that a locking key 20 which is in the form of a cotter pin may be passed through the alined openings 18 or 19 and through the opening 14 formed in the bolt. This will securely connect the locking means with the bolt and will prevent the bolt from turning in the nut. By having the side arms 16 of the locking means provided with the two sets of openings 18 and 19, the bolt and nut will be permitted of a finer amount of adjustment since the nut can be tightened until it is also as tight as necessary and then the locking means put in place and the nut, together with the locking means, then turned a sufficient amount to bring either the openings 18 or 19 into alinement with the opening 14 so that the locking key 20 can be put in place.

It has been stated that the locking device will be formed of metal, but it is, of course, obvious that this device can be formed of any suitable material. A locking device has thus been provided which will be very efficient in operation and which can be very cheaply and easily manufactured.

What is claimed is:

1. A nut lock comprising a bolt having its threaded end portion provided with a transversely extending opening, a nut screwed upon said bolt, a locking strip engaging said nut and formed from a single strip of material bent intermediate its length to provide a U-shaped locking means extending over the end of the bolt with its arms extending along the sides of said nut and bent longitudinally, whereby each arm will engage two faces of the nut, each arm being provided with a plurality of openings positioned upon the opposite sides of the longitudinal center of the arm whereby a selected set of openings may be brought into alinement with the opening of said bolt, and locking means passing through the alined openings of said bolt and arms.

2. In a device of the character described, a bolt provided with a transversely extending opening, a nut carried by said bolt, a locking strip extending across the end of said bolt and having its end portion bent to form arms extending along the sides of said nut, the arms being provided with a plurality of alined openings whereby said locking means may be placed in engagement with the sides of the nut and a selected set of openings brought into alinement with the opening of said bolt, and securing means passing through the alined openings of said bolt and locking means.

In testimony whereof I affix my signature in presence of two witnesses.

EDWIN A. BARDWELL.

Witnesses:
CLIFTON L. MCKNIGHT,
ROLAND S. HARDY.